United States Patent
Goto et al.

(10) Patent No.: US 12,545,885 B2
(45) Date of Patent: Feb. 10, 2026

(54) CULTURE DEVICE AND CULTURE METHOD

(71) Applicant: HONDA MOTOR CO., LTD., Tokyo (JP)

(72) Inventors: Minoru Goto, Tochigi-ken (JP); Nozomi Shiobara, Tochigi-ken (JP); Shohei Kinoshita, Tochigi-ken (JP); Mizuho Doi, Tochigi-ken (JP); Kenji Machida, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 725 days.

(21) Appl. No.: 17/915,122

(22) PCT Filed: Mar. 24, 2021

(86) PCT No.: PCT/JP2021/012189
§ 371 (c)(1),
(2) Date: Sep. 28, 2022

(87) PCT Pub. No.: WO2021/200449
PCT Pub. Date: Oct. 7, 2021

(65) Prior Publication Data
US 2023/0159884 A1    May 25, 2023

(30) Foreign Application Priority Data
Mar. 30, 2020   (JP) .................................. 2020-059323

(51) Int. Cl.
*C12N 1/12* (2006.01)
*C12M 1/00* (2006.01)

(52) U.S. Cl.
CPC ............... *C12N 1/12* (2013.01); *C12M 29/06* (2013.01)

(58) Field of Classification Search
CPC ......... C12N 1/12; C12M 29/06; C12M 29/08; C12M 21/02; C12M 27/20; C12M 27/24
(Continued)

(56) References Cited

U.S. PATENT DOCUMENTS

2001/0055237 A1* 12/2001 Kubera ............. B01F 23/23341
366/264
2017/0326507 A1* 11/2017 Oldani ............ B01F 23/232311
2021/0403848 A1 12/2021 Tsuzuki et al.

FOREIGN PATENT DOCUMENTS

CN 101918529 12/2010
CN 110785482 2/2020
(Continued)

OTHER PUBLICATIONS

Machine Translation of JPH0779654A (Year: 2025).*
(Continued)

*Primary Examiner* — Michael L Hobbs
(74) *Attorney, Agent, or Firm* — Amin, Turocy & Watson, LLP

(57) ABSTRACT

A culture device by which microalgae can be satisfactorily cultured using a simple structure while suppressing an increase in energy consumption, and a culture method. A main body of this culture device comprises an accommodation part which accommodates contents and to which gas is supplied. The inner wall faces of the accommodation part are joined together to form a joined part which extends along the gas supply direction. A guide part and a circulation part, which are adjacent to each other across the joined part, are each along the extending direction of the joined part and communicated with each other via a guide part inlet and a guide part outlet. A gas supply port enables gas supply toward the guide part.

11 Claims, 9 Drawing Sheets

(58) Field of Classification Search
USPC .............................................................. 47/1.4
See application file for complete search history.

(56) References Cited

FOREIGN PATENT DOCUMENTS

| | | | | |
|---|---|---|---|---|
| JP | 61-071891 | 4/1986 | | |
| JP | 07-079654 | 3/1995 | | |
| JP | H0779654 B2 * | 8/1995 | ............ | C12M 29/06 |
| JP | 2003-088355 | 3/2003 | | |
| JP | 2019-068773 | 5/2019 | | |
| KR | 101905084 | 10/2018 | | |
| WO | 2009/090549 | 7/2009 | | |

OTHER PUBLICATIONS

Chinese Office Action and Search Report for Chinese Patent Application No. 202180025501.3 dated Mar. 28, 2025.
Liu, et al. "Research progress on light characteristics in process of microalgal cultivation", Chinese Journal of Bioprocess Engineering, vol. 9 No. 6, Nov. 15, 2011, pp. 69-76.
International Search Report and Written Opinion for International Application No. PCT/JP2021/012189 mailed on May 11, 2021, 9 pages.

* cited by examiner

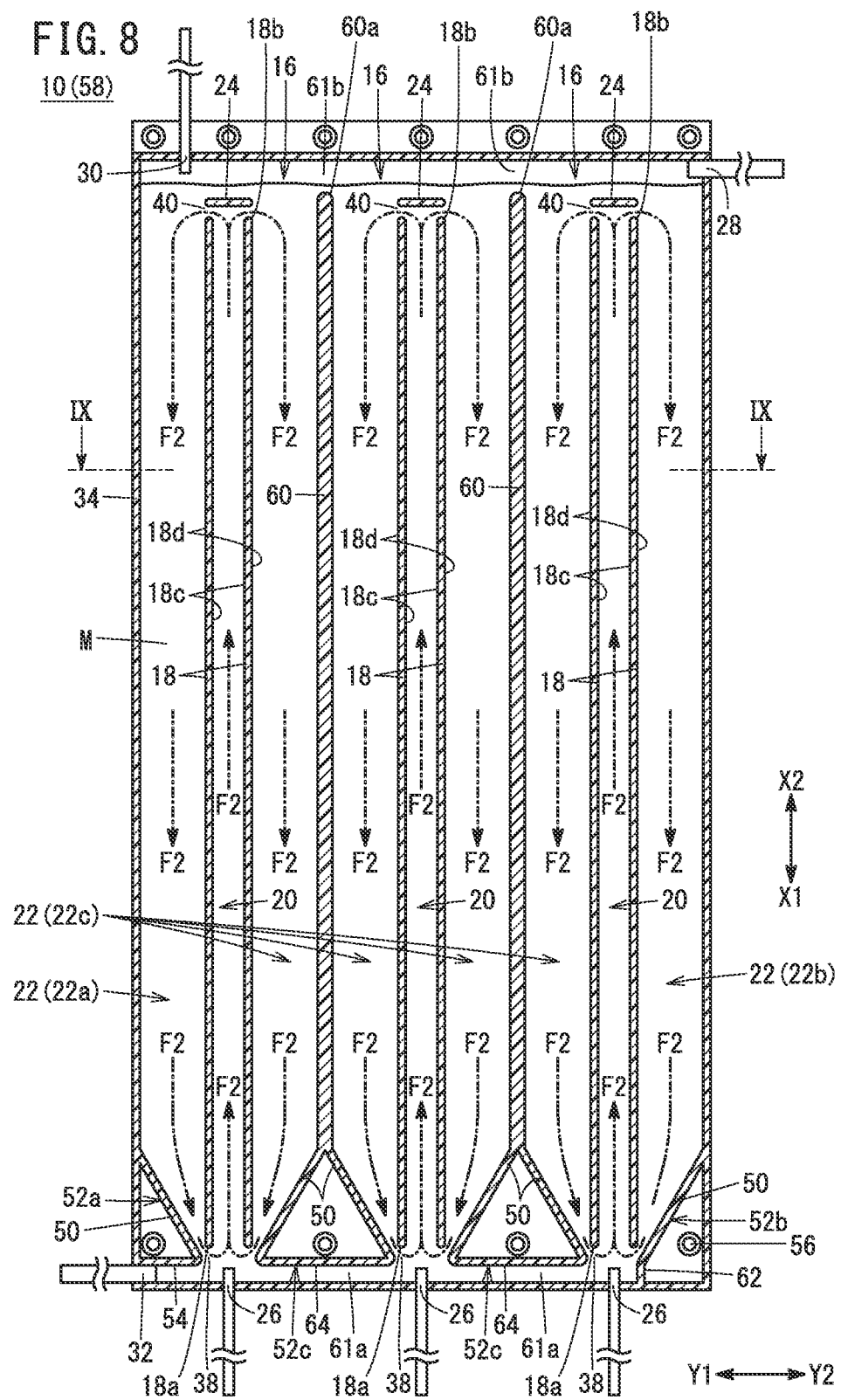

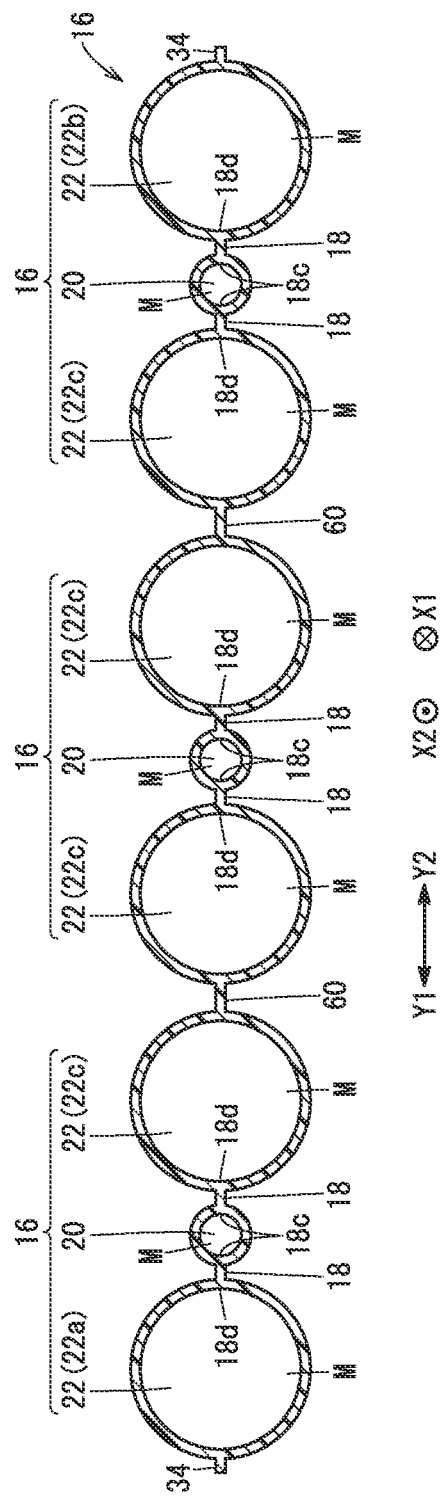

CULTURE DEVICE AND CULTURE METHOD

TECHNICAL FIELD

The present invention relates to a culture device and a culture method for culturing microalgae in a culture solution.

BACKGROUND ART

Microalgae are cultured by supplying light and carbon dioxide gas to the microalgae in a culture solution to thereby carry out photosynthesis. In order to efficiently culture the microalgae, it is essential to supply the light and the carbon dioxide evenly to the entirety of the microalgae in the culture solution to thereby promote photosynthesis.

Thus, for example, as disclosed in JP 2019-068773 A, a culture device is known in which microalgae are cultured while a culture solution is circulated inside a culturing tank. Such a culture device is equipped with a culturing tank for storing the culture solution, a main supply pipe arranged along a longitudinal direction of the culturing tank, and a water pump for delivering and circulating the culture solution inside the culture tank to the interior of the main supply pipe. A plurality of through holes are formed on a wall surface of the main supply pipe at a predetermined interval in an axial direction of the main supply pipe. Therefore, when the culture solution is delivered by the water pump to the interior of the main supply pipe, due to the culture solution flowing out from the through holes, a flow of the culture solution is formed which is capable of allowing the microalgae to circulate in the interior of the culturing tank.

SUMMARY OF THE INVENTION

However, in the aforementioned culture device, since it is necessary to drive the water pump in order to cause the culture solution to circulate, a concern arises in that energy consumption when culturing the microalgae may increase. In particular, for a case in which production of biofuels or the like is carried out using the cultured microalgae, from the standpoint of reducing production costs and realizing carbon neutrality, it is necessary to reduce the introduction energy as much as possible.

The present invention has been devised in order to solve the aforementioned problems, and has the object of providing a culture device and a culture method which are capable of satisfactorily culturing microalgae with a simple configuration while suppressing an increase in energy consumption.

One aspect of the present invention is characterized by a culture device that cultures microalgae in a culture solution, the culture device comprising a main body portion including an accommodation unit which is configured to accommodate the culture solution and the microalgae, and to which a gas is supplied, a joint member that is formed by joining together inner wall surfaces of the accommodation unit and extends in a direction in which the gas is supplied, a guide unit and a circulation unit that are disposed in an interior of the accommodation unit, are adjacent to each other with the joint member being interposed therebetween, and lie respectively along a direction in which the joint member extends, and a gas supply port configured to enable the gas to be supplied to the guide unit, wherein the gas is supplied to the guide unit from a lower side to an upper side when the main body portion is installed at an installation location, the guide unit and the circulation unit communicate with each other via a guide unit inlet port provided on an upstream side in the direction in which the gas is supplied, and a guide unit outlet port provided on a downstream side in the direction in which the gas is supplied, and when the gas flows through the guide unit, a culture solution flow is generated in which the culture solution inside the circulation unit flows into the guide unit from the guide unit inlet port, and the culture solution inside the guide unit flows out from the guide unit outlet port into the circulation unit.

Another aspect of the present invention is characterized by a culture method for culturing microalgae using the above-described culture device, the culture method comprising an installation step of installing, in the water storage unit in which the stored water is stored, the main body portion prior to the culture solution being accommodated in the accommodation unit, and an accommodation step of accommodating the culture solution in the accommodation unit, in a state in which the main body portion is installed in the water storage unit.

In such a culture device, a gas such as carbon dioxide which is required for culturing the microalgae is supplied from the gas supply port and made to flow through the guide unit, whereby the culture solution flow is capable of being generated inside the accommodation unit. Since the microalgae can be allowed to circulate due to the culture solution flow, gas and light can be effectively supplied to the entirety of the microalgae inside the accommodation unit, and photosynthesis can be promoted.

In addition, in the culture device, by joining the inner wall surfaces of the main body portion and thereby forming the joint member, it is possible to easily provide a configuration such as the guide unit and the circulation unit in order to generate the culture solution flow. Further, in the culture device, for example, it is not necessary to provide and drive a special configuration such as a water pump or the like in order to generate the culture solution flow.

From the above, according to the present invention, it is possible to satisfactorily culture the microalgae with a simple configuration while suppressing an increase in energy consumption.

BRIEF DESCRIPTION OF DRAWINGS

FIG. 3 is used;

FIG. 8 is a schematic cross-sectional view of a main body portion according to another exemplary modification; and FIG. 9 is a cross-sectional view taken along line IX-IX of FIG. 8.

DESCRIPTION OF THE INVENTION

Figure 1:
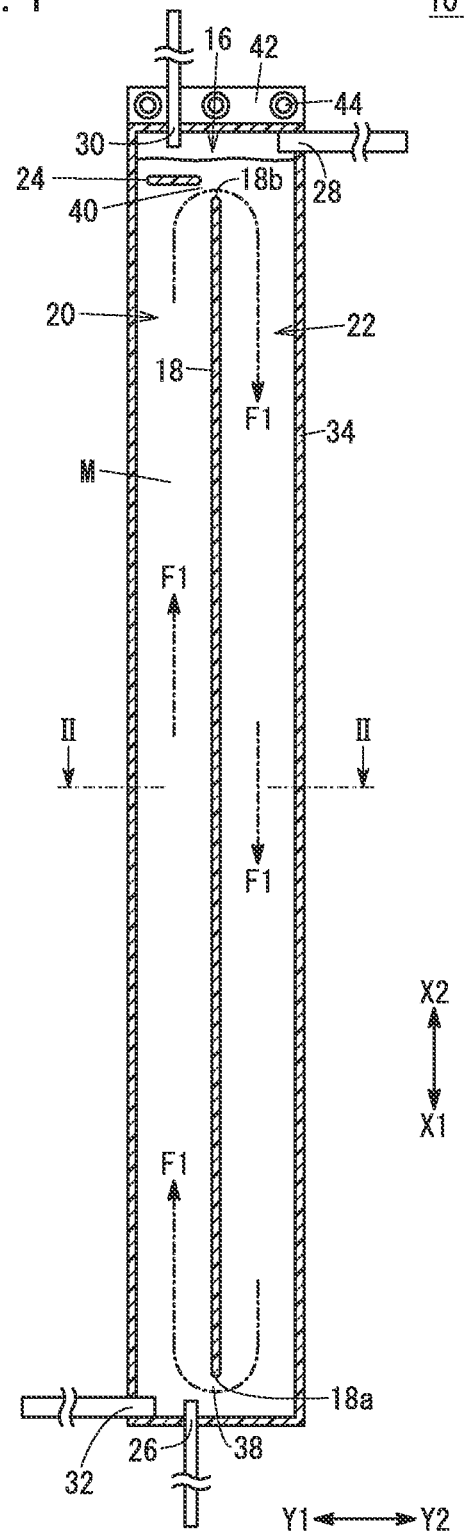
FIG. 1 is a schematic cross-sectional view of a main body portion of a culture device according to an embodiment of the present invention.

A preferred embodiment concerning a culture device and a culture method according to the present invention will be presented and described in detail below with reference to the accompanying drawings. Moreover, in the drawings described below, constituent elements having the same or similar functions and effects are designated by the same reference numerals, and repeated description thereof may be omitted.

Figure 2:
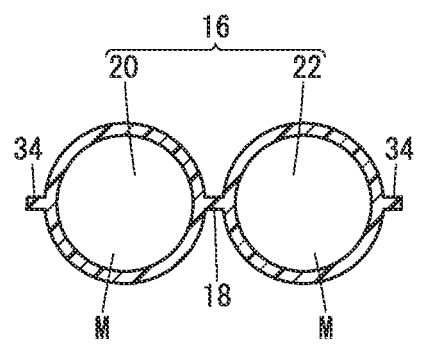
FIG. 2 is a cross-sectional view taken along line II-II of FIG. 1.
Figure 3:
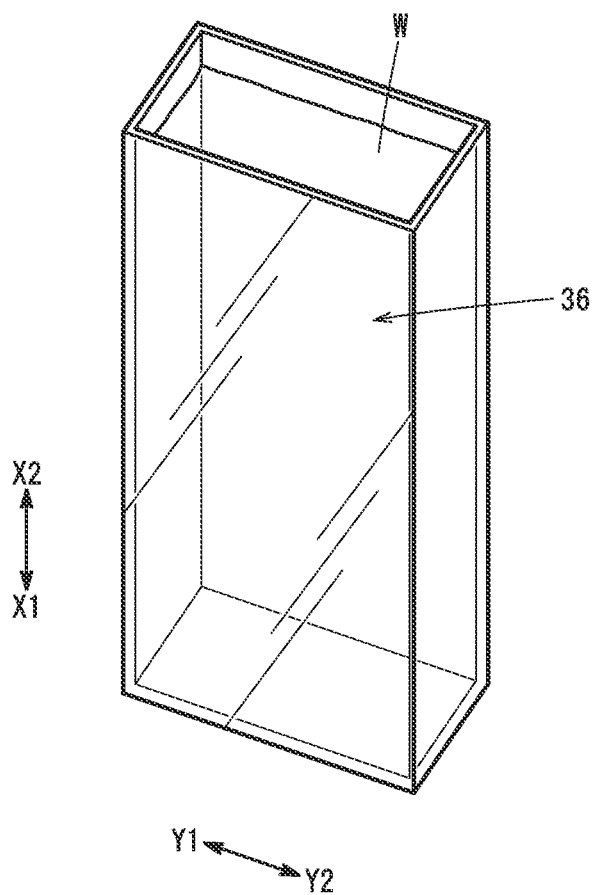
FIG. 3 is a schematic perspective view of a water storage tank of the culture device according to the embodiment of the present invention.

A culture device 10 according to the present embodiment shown in FIGS. 1 to 3 cultures microalgae by supplying light and a gas such as a carbon dioxide gas or a carbon dioxide-containing gas to microalgae (not shown) in a culture solution containing water, so that the microalgae proliferate while carrying out photosynthesis. Although the microalgae that are capable of being cultured by the culture device 10 are not particularly limited, for example, in the case of producing a biofuel such as ethanol using the cultured microalgae, microalgae which are classified as Chlorophyceae (e.g., *Chlamydomonas, chlorella*), Prasinophytes, Cryptophytes, and Cyanobacteria (e.g., *Spirulina*) are preferred. In addition to water, the culture solution may contain nutrients and the like necessary for culturing the microalgae. The gas preferably contains a carbon dioxide gas discharged from a factory or the like.

As an environment that can be irradiated with light having a wavelength (for example, 400 to 700 nm) required for growth of the microalgae, for example, the culture device 10 is installed outdoors where it can be irradiated with sunlight. Moreover, the culture device 10 may be installed in a room or the like where it can be irradiated with sunlight or artificial light. Further, the culture device 10 includes a main body portion 12 as shown in FIG. 1 and FIG. 2, and a water storage tank 14 as shown in FIG. 3. The main body portion 12 is formed, for example, from a material that is flexible and transmits light, such as linear low density polyethylene (LLDPE). It should be noted that the term "material that transmits light" implies that such a material can transmit light having a wavelength required for growth of the microalgae. In the present embodiment, the main body portion 12 is formed in a hollow shape (a bag shape) by superimposing two sheets made up from the aforementioned material; however, the present invention is not particularly limited to this feature.

In the embodiment shown in FIG. 1 and FIG. 2, the main body portion 12 includes, one each respectively, of an accommodation unit 16, a joint member 18, a guide unit 20, a circulation unit 22, a facing portion 24, a gas supply port 26, a culture solution supply port 28, a gas discharge port 30, and a collection port 32.

The accommodation unit 16 is disposed in the interior of the hollow shaped main body portion 12, and the culture solution and the microalgae are accommodated as contents M therein. Further, the gas is supplied to the accommodation unit 16 via the gas supply port 26 which is connected to a non-illustrated gas supply mechanism. According to the present embodiment, the accommodation unit 16 is surrounded by an enclosure 34 which is formed by joining together the inner wall surfaces of the main body portion 12 by means of welding or the like, along an outer peripheral edge portion of the main body portion 12. In other words, the culture device 10 is a so-called closed system in which the microalgae are cultured in the culture solution that is accommodated in the interior of the sealed accommodation unit 16.

Figure 5A:
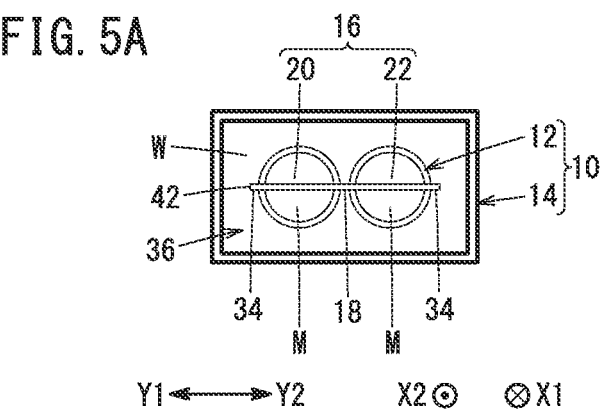
FIG. 5A and FIG. 5B are explanatory diagrams for describing an accommodation step of the culture method shown in FIG. 4A and FIG. 4B.
Figure 5B:
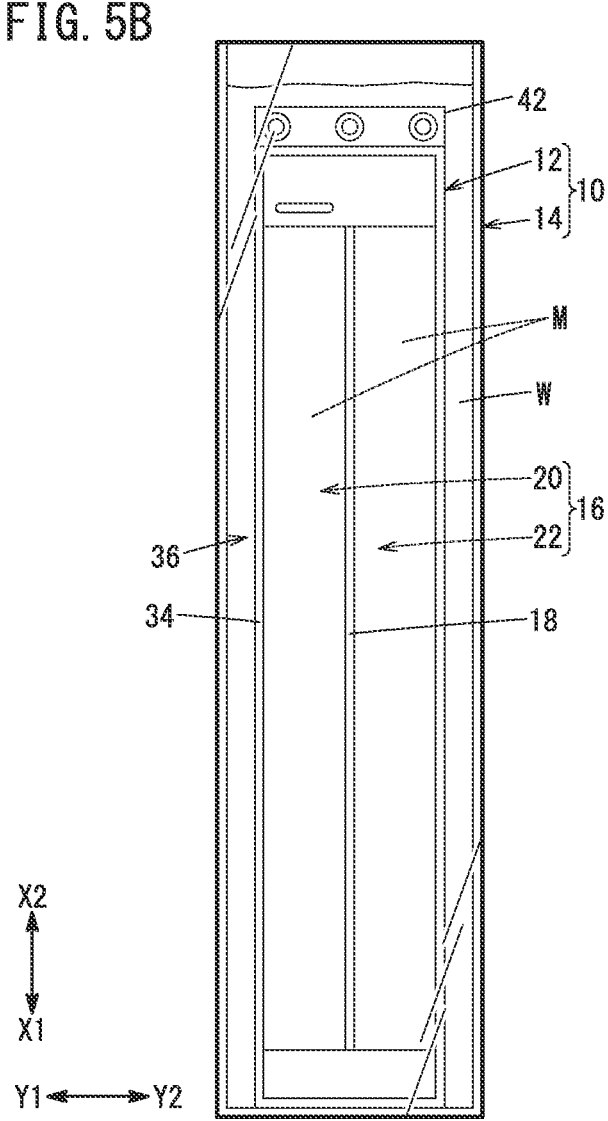

Further, as will be described later, when the main body portion 12 is installed in a water storage unit 36 (an installation location) of the water storage tank 14 shown in FIG. 5A and FIG. 5B, the gas is supplied to the interior of the accommodation unit 16 from a lower side (the side of the arrow X1) toward an upper side (the side of the arrow X2) in the vertical direction. Each of the main body portion 12 and the accommodation unit 16 is formed in a rectangular shape, with the direction in which the gas is supplied (the vertical direction) being the long side and the horizontal direction being the short side as viewed from the front.

The joint member 18 is formed by joining together the inner wall surfaces of the accommodation unit 16 (the main body portion 12) by welding or the like, and extends in the direction (the vertical direction, the direction of the arrows X1 and X2) in which the gas is supplied. The length of the joint member 18 in the direction in which the joint member extends is set to be shorter than the length of the accommodation unit 16 in the vertical direction. One end part 18a and another end part 18b of the joint member 18 in the direction in which the joint member extends are each formed in an arcuate shape.

In the interior of the accommodation unit 16, the guide unit 20 and the circulation unit 22 are adjacent to each other with the joint member 18 being interposed therebetween, and are arranged respectively along the direction in which the joint member 18 extends. In other words, the guide unit 20 and the circulation unit 22 are adjacent to each other with the joint member 18 being interposed in a short-side direction (the direction of the arrows Y1 and Y2) of the accommodation unit 16. When the contents M are accommodated in the accommodation unit 16, as shown in FIG. 2, each of the guide unit 20 and the circulation unit 22 has a substantially cylindrical shape as viewed in the vertical direction. According to the present embodiment, the respective inner diameters of the guide unit 20 and the circulation unit 22 as viewed in the vertical direction are substantially the same; however, the present invention is not particularly limited to this feature.

As shown in FIG. 1, the guide unit 20 and the circulation unit 22 communicate with each other via a guide unit inlet port 38 provided on an upstream side (the side of the arrow X1) in the direction in which the gas is supplied, and a guide unit outlet port 40 provided on a downstream side (the side of the arrow X2) in the direction in which the gas is supplied. Hereinafter, the upstream side in the direction in which the gas is supplied may also be simply referred to as an "upstream side", and the downstream side in the direction in which the gas is supplied may also be simply referred to as a "downstream side". In the present embodiment, the upstream side is a lower side in the vertical direction. Further, the downstream side is an upper side in the vertical direction.

As noted previously, by the length of the joint member 18 in the direction of extension thereof being shorter than the length of the accommodation unit 16 in the vertical direction, the guide unit inlet port 38 is disposed between the one end part 18a (the end part on the side of the arrow X1) of the joint member 18 in the direction of extension thereof, and the enclosure 34. Further, the guide unit outlet port 40 is disposed between the other end part 18b (the end part on the side of the arrow X2) of the joint member 18 in the direction of extension thereof, and the enclosure 34.

The facing portion 24 is formed by joining together the inner wall surfaces of the main body portion 12 by welding or the like, and faces toward the guide unit 20 at a location above the other end part 18b of the joint member 18. The facing portion 24 extends along a direction (the direction of the arrows Y1 and Y2 in the present embodiment) that intersects with the direction in which the gas is supplied. Both ends of the facing portion 24 in the direction of extension thereof are preferably formed in an arcuate shape.

The gas supply port 26 is disposed below the guide unit 20, and is capable of supplying the gas from the gas supply mechanism toward the guide unit 20. In this manner, by supplying the gas via the gas supply port 26, the gas can be made to flow through the guide unit 20 in the direction (the vertical direction) in which the gas is supplied. When the gas flows through the guide unit 20 in this manner, a culture solution flow F1 is generated in which the culture solution (the contents M) inside the circulation unit 22 flows into the guide unit 20 from the guide unit inlet port 38, and the culture solution inside the guide unit 20 flows out from the guide unit outlet port 40 into the circulation unit 22.

The culture solution supply port 28 is disposed, for example, on an upper end side of the main body portion 12. Further, the culture solution supply port 28 is connected to a non-illustrated culture solution supply mechanism, and is capable of supplying the culture solution to the interior of the accommodation unit 16. Moreover, the microalgae may be supplied together with the culture solution to the interior of the accommodation unit 16 via the culture solution supply port 28.

The gas discharge port 30 is disposed on the upper end side of the main body portion 12, and is capable of discharging the gas in the interior of the accommodation unit 16. As gases that exist in the interior of the accommodation unit 16, there may be cited a residual gas that has not been consumed by photosynthesis of the microalgae, oxygen gas that is generated by photosynthesis, and the like, from among the gases supplied from the gas supply port 26.

The collection port 32 is disposed, for example, on a lower end side of the main body portion 12, and is capable of collecting the contents M in the accommodation unit 16. The culture solution supply port 28 and the collection port 32 are provided so as to be capable of opening and closing, and can be closed except when the culture solution is supplied to and discharged from the accommodation unit 16.

Above the accommodation unit 16 in the main body portion 12, a fixing member 42 that is isolated from the interior of the accommodation unit 16 is provided. The fixing member 42 is provided with through holes 44 through which non-illustrated support members or the like are inserted when the main body portion 12 is installed in the water storage unit 36 of the water storage tank 14 as shown in FIG. 5A and FIG. 5B.

Similar to the main body portion 12, the water storage tank 14 shown in FIG. 3 is formed, for example, from a material that is flexible and transmits light, such as linear low density polyethylene (LLDPE). Moreover, the water storage tank 14 may be formed from a material that transmits light, such as acrylic resin, polycarbonate resin, or glass. The water storage tank 14 includes the water storage unit 36 in which stored water W is stored. The stored water W is a liquid that transmits light, such as water. The water storage unit 36 is set to be larger than the external dimensions of the main body portion 12, and as shown in FIG. 5A and FIG. 5B, the main body portion 12 is capable of being installed in the interior of the water storage unit 36. Moreover, although the water storage tank 14 having a casing shape is shown in FIGS. 3 to 5B, the water storage tank 14 may have various shapes in which the water storage unit 36 can be formed, and may have a bag shape, for example.

Figure 4A:
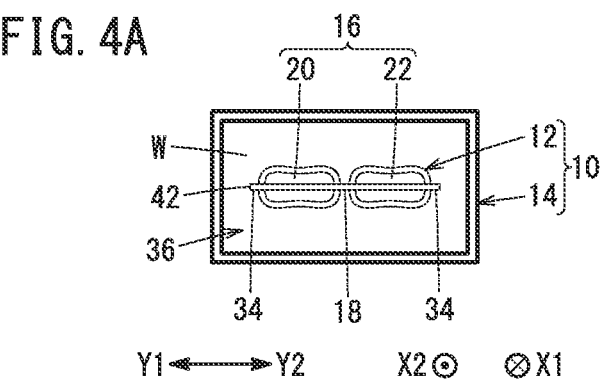
FIG. 4A and FIG. 4B are explanatory diagrams for describing an installation step of a culture method according to an embodiment of the present invention in which the culture device shown in FIG. 1
Figure 4B:
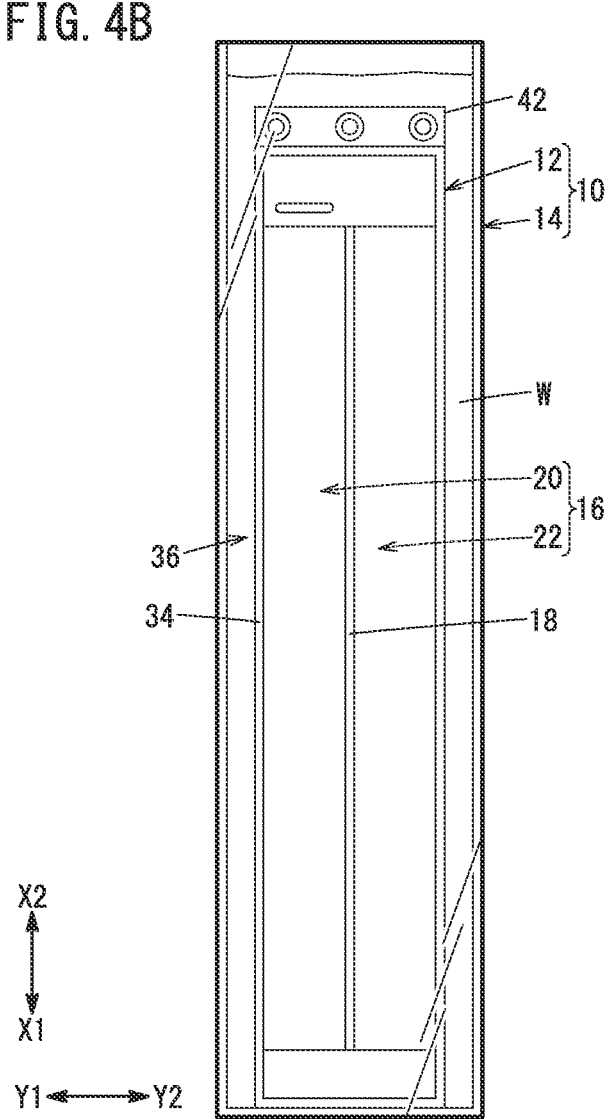

The culture device 10 is basically configured in the manner described above. Next, a description will be given with reference to FIGS. 1 to 5B concerning a culture method according to the present embodiment in which the culture device 10 is used. In such a culture method, first, as shown in FIG. 3, the stored water W is stored in the water storage unit 36 of the water storage tank 14. Then, as shown in FIG. 4A and FIG. 4B, an installation step is performed in which the main body portion 12, prior to the contents M being accommodated in the accommodation unit 16, is installed in the interior of the water storage unit 36. Next, as shown in FIG. 5A and FIG. 5B, in a state in which the main body portion 12 is installed in the water storage unit 36, an accommodation step is performed in which the contents M are accommodated in the accommodation unit 16 from the culture solution supply mechanism via the culture solution supply port 28.

Next, a gas supplying step is performed in which the gas from the gas supply mechanism is supplied to the guide unit 20 of the accommodation unit 16 via the gas supply port 26. As a result, the culture solution flow F1 can be generated inside the accommodation unit 16, whereby the gas can be supplied to the entirety of the microalgae while allowing the microalgae to circulate. Further, since each of the water storage tank 14, the stored water W, and the main body portion 12 transmits light, it is possible for the microalgae inside the accommodation unit 16 to be irradiated with light from various directions. As a result, inside the accommodation unit 16, the microalgae proliferate while carrying out photosynthesis.

After the microalgae have been sufficiently proliferated inside the accommodation unit 16 by culturing the microalgae in the manner mentioned above, a collection step is performed in which the contents M are collected from the interior of the accommodation unit 16 via the collection port 32. By separating the contents M into the microalgae and the culture solution, the microalgae can be obtained.

From the above, in the culture device 10 according to the present embodiment and the culture method according to the present embodiment in which the culture device 10 is used, the gas which is required for culturing the microalgae is supplied from the gas supply port 26 and is made to flow through the guide unit 20, whereby the culture solution flow F1 can be generated inside the accommodation unit 16. Since the microalgae can be allowed to circulate due to the culture solution flow F1, gas and light can be effectively supplied to the entirety of the microalgae inside the accommodation unit 16, and photosynthesis can be promoted.

In addition, in the culture device 10, by means of a simple configuration in which the joint member 18 is formed by joining together the inner wall surfaces of the main body portion 12, it is possible to provide the guide unit 20, the circulation unit 22, or the like, and generate the culture solution flow F1. Further, in the culture device 10, for example, it is not necessary to provide and drive a special configuration such as a water pump in order to generate the culture solution flow F1.

Therefore, according to the culture device 10 and the culture method, it is possible to satisfactorily culture the microalgae with a simple configuration while suppressing an increase in energy consumption.

In the culture device 10 according to the above-described embodiment, the one end part 18a and the other end part 18b of the joint member 18 in the direction of extension thereof have an arcuate shape. Further, both ends of the facing portion 24 also have an arcuate shape. In the case of such features, since it is possible to prevent the corners where concentration of stress is likely to occur from being formed at the joint member 18 and the facing portion 24, damage to the main body portion 12 due to hydraulic pressure of the culture solution or the like can be suppressed, and the durability of the culture device 10 can be increased. Moreover, the shape of the end parts of the joint member 18 and the facing portion 24 is not necessarily limited to an arcuate shape.

In the culture device 10 according to the above-described embodiment, the main body portion 12 is supplied with the gas from the lower side toward the upper side when the main body portion 12 is installed in the water storage unit 36 (the installation location) of the water storage tank 14. In this case, due to the buoyancy of the gas bubbles within the culture solution, the gas can be raised from the lower side toward the upper side of the guide unit 20. Therefore, the gas can be satisfactorily made to flow through the interior of the guide unit 20 without increasing the gas supply pressure, and the culture solution flow F1 can be satisfactorily generated. Consequently, it is possible to reduce the energy consumption when culturing the microalgae.

The direction in which the gas is supplied is not limited to being from the lower side toward the upper side in the vertical direction, and for example, may be an inclined direction with respect to the vertical direction. Further, the direction in which the joint member 18 extends can also be set in accordance with the direction in which the gas is supplied.

The culture device 10 according to the above-described embodiment is provided with the water storage tank 14 including the water storage unit 36 in which the stored water W is stored, the main body portion 12 being capable of being installed in the water storage unit 36. In this case, due to the stored water W, it becomes easy to maintain the temperature of the culture solution inside the accommodation unit 16 at a temperature that is suitable for culturing the microalgae. Therefore, it is possible to more satisfactorily culture the microalgae. It should be noted that the culture device 10 need not necessarily be equipped with the water storage tank 14.

The culture method according to the above-described embodiment includes the installation step of installing, in the water storage unit 36 in which the stored water W is stored, the main body portion 12 prior to the culture solution being accommodated, and the accommodation step of accommodating the culture solution in the accommodation unit 16, in a state in which the main body portion 12 is installed in the water storage unit 36. In this case, the contents M (the culture solution) can be accommodated in the accommodation unit 16 in a state in which the main body portion 12 is subjected to the water pressure of the stored water W. Therefore, it is possible to prevent the main body portion 12 from becoming damaged due to the hydraulic pressure of the contents M inside the accommodation unit 16.

The present invention is not particularly limited to the embodiment described above, and various modifications can be made to the invention without departing from the essence and gist thereof.

Figure 6:
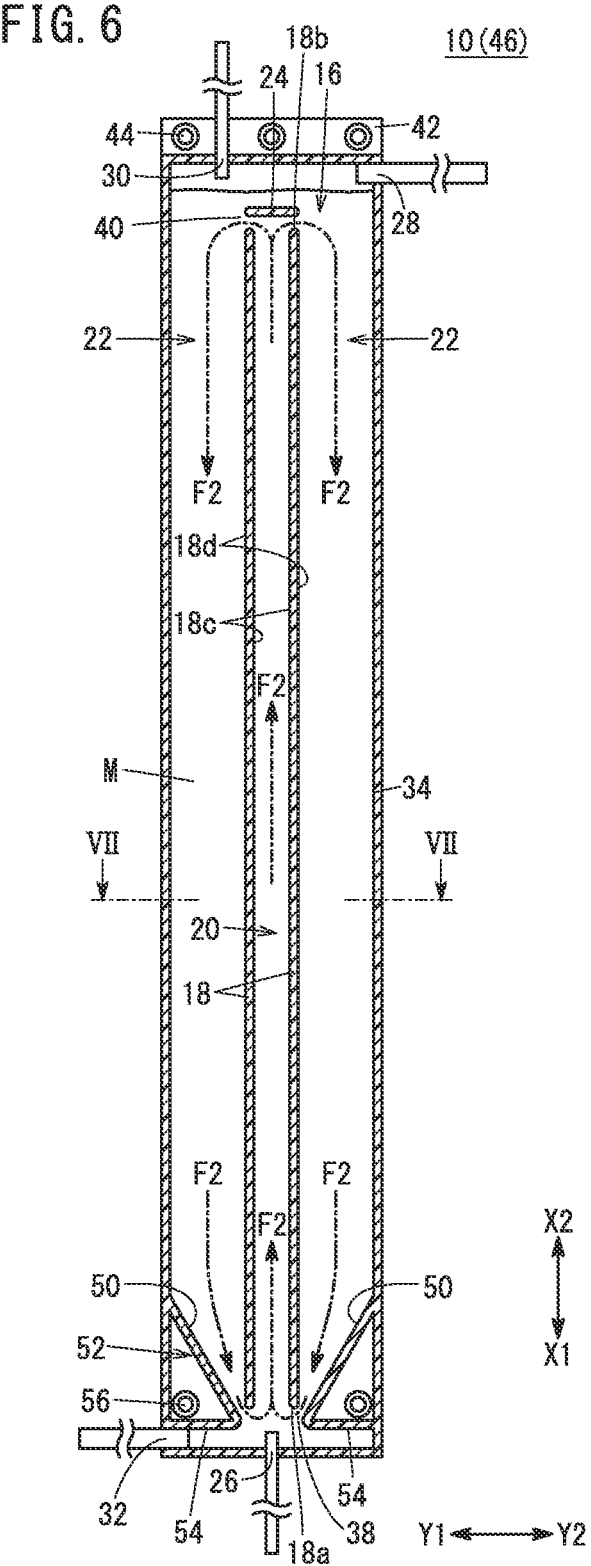
FIG. 6 is a schematic cross-sectional view of a main body portion according to an exemplary modification.
Figure 7:
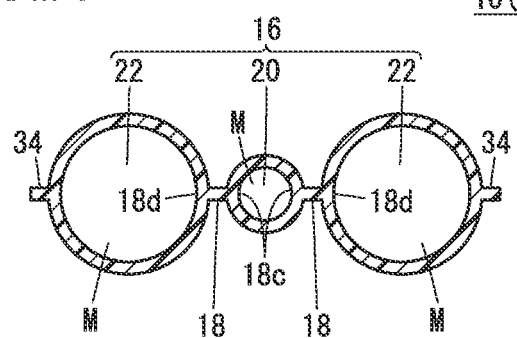
FIG. 7 is a cross-sectional view taken along line VII-VII of FIG. 6.

For example, instead of the main body portion 12 shown in FIG. 1 and FIG. 2, the culture device 10 may be equipped with a main body portion 46 shown in FIG. 6 and FIG. 7. The main body portion 46 shown in FIG. 6 and FIG. 7 mainly differs from the main body portion 12 shown in FIG. 1 and FIG. 2, in that the guide unit 20 is disposed between inner side surfaces 18c of a pair of joint members 18 that face toward each other at an interval, and the circulation units 22 are formed respectively on the sides of outer side surfaces 18d of the pair of joint members 18.

As shown in FIG. 6, in the accommodation unit 16, the guide unit 20, which extends in a long-side direction of the accommodation unit 16 (the direction of the arrows X1 and X2), is provided substantially in the center thereof in the short-side direction (the direction of the arrows Y1 and Y2). Along with this feature, the gas supply port 26 is provided substantially in the center in the short-side direction on the lower end side of the accommodation unit 16. Further, the facing portion 24 is provided substantially in the center of the accommodation unit 16 in the short-side direction at a location above the other end parts 18b (the end part on the side of the arrow X2) of the joint members 18.

The circulation units 22 that extend in the long-side direction are provided on both sides of the guide unit 20 in the short-side direction of the accommodation unit 16. As shown in FIG. 7, in the main body portion 46, when viewed in the vertical direction, the inner diameters of the circulation units 22 are substantially the same, and the inner diameter of the guide unit 20 is formed to be smaller than the inner diameters of the circulation units 22. However, the relationship between the size of the inner diameter of the guide unit 20 and the size of the inner diameters of the circulation units 22 is not particularly limited.

A pair of inclined sections 50 are formed in the circulation units 22 on the side of the guide unit inlet ports 38 (the side of the arrow X1) by joining together the inner wall surfaces of the main body portion 46 by welding or the like. Each of the inclined sections 50 is inclined in a direction away from the guide unit 20 from the lower side (the side of the arrow X1) toward the upper side (the side of the arrow X2) when the main body portion 46 is installed at the installation location. According to the embodiment shown in FIG. 6, the lower end parts of the respective inclined sections 50 are arranged below the one end parts 18a of the joint members 18.

In the main body portion 46, sealing members 52 isolated from the accommodation unit 16 are formed by joining together the inner wall surfaces of the main body portion 46 by welding or the like. According to the embodiment shown in FIG. 6, the sealing members 52 are formed in a triangular shape surrounded by: the inclined sections 50; bottom side portions 54 that extend along the short-side direction of the accommodation unit 16 from lower end parts of the inclined sections 50 toward the sides away from the guide unit 20; and portions of the enclosure 34 that extend along the long-side direction. Since the sealing member 52 is isolated from the accommodation unit 16, the inward flow of the contents M into the inner side of the triangular shape of the sealing member 52 is restricted.

Position fixing holes 56 are provided in the sealing members 52. In the same manner as the through holes 44 provided in the fixing member 42, the position fixing holes 56 enable support members or the like to be inserted therethrough when the main body portion 46 is installed in the water storage unit 36 of the water storage tank 14. Moreover, the sealing members 52 may be formed in a manner so as to be isolated from the accommodation unit 16 by joining together the inner wall surfaces of the main body portion 46 by welding or the like. In other words, the sealing members 52 are not limited to being formed in a triangular shape surrounded by the inclined sections 50, the bottom side portions 54, and the portions of the enclosure 34.

In the main body portion 46 as well, which is configured in the manner described above, by supplying the gas via the gas supply port 26, the gas can be made to flow through the guide unit 20 in the direction (the vertical direction) in which the gas is supplied. When the gas flows through the guide unit 20, a culture solution flow F2 is generated in which the culture solution (the contents M) flows into the guide unit 20 via the guide unit inlet ports 38 from the circulation units 22 disposed on both sides in the short-side direction of the accommodation unit 16, and the culture solution flows out from the guide unit 20 via the guide unit outlet port 40 into the circulation units 22 disposed on both sides in the short-side direction.

The culture method, in which the culture device 10 equipped with the main body portion 46 shown in FIG. 6 and FIG. 7 is used, can be carried out in a similar manner to the culture method, in which the culture device 10 equipped with the main body portion 12 shown in FIG. 1 and FIG. 2 is used. Accordingly, in the culture device 10 equipped with the main body portion 46 shown in FIG. 6 and FIG. 7 and the culture method in which the culture device 10 is used as well, it is possible to satisfactorily culture the microalgae with a simple configuration while suppressing an increase in energy consumption.

In addition, in the culture device 10 equipped with the main body portion 46, by allowing the gas to flow through the guide unit 20, the culture solution flow F2 can be generated respectively between the guide unit 20 and the circulation units 22 on both sides thereof. Therefore, it is possible to efficiently cause the culture solution flow F2 to be generated in the accommodation unit 16 and to cause the microalgae to be satisfactorily circulated, and hence to satisfactorily culture the microalgae.

In the culture device 10 according to the above-described embodiment, the inclined sections 50, which are inclined in a direction away from the guide unit 20 from the lower side toward the upper side when the main body portion 46 is installed at the installation location, are formed in the circulation units 22 on the side of the guide unit inlet ports 38 by joining together the inner wall surfaces of the main body portion 46. In this case, even if the microalgae settle inside the accommodation unit 16 under the action of gravity, the microalgae can be guided toward the guide unit inlet ports 38 via the inclined sections 50. As a result, it is possible to cause the microalgae in the accommodation unit 16 to circulate more satisfactorily. It should be noted that the inclined sections 50 need not necessarily be provided in the main body portion 46.

In the culture device 10 according to the above-described embodiment, the sealing members 52 isolated from the accommodation unit 16 are formed in the main body portion 46 by joining together the inner wall surfaces of the main body portion 46, and the position fixing holes 56 used when the main body portion 46 is installed are provided on the sealing members 52. In this case, the position fixing holes 56 can be provided in the main body portion 46 by means of a simple configuration in which the inner wall surfaces of the main body portion 46 are joined together to thereby form the sealing members 52. By providing the position fixing holes 56 in this manner, it becomes possible to easily install the main body portion 46 at the installation location. It should be noted that the sealing members 52 and the position fixing holes 56 need not necessarily be provided in the main body portion 46.

Instead of the main body portion 46 shown in FIG. 6 and FIG. 7, the culture device 10 may be equipped with a main body portion 58 shown in FIG. 8 and FIG. 9. The main body portion 58 shown in FIG. 8 and FIG. 9 mainly differs from the main body portion 46 shown in FIG. 6 and FIG. 7, in that partitions 60 that extend in the direction in which the gas is supplied are included therein.

As shown in FIG. 8, the partitions 60 are formed by joining together the inner wall surfaces of the main body portion 58 by welding or the like. The length of the partitions 60 in the direction of extension thereof is set to be shorter than the length of the accommodation unit 16 in the vertical direction, and longer than the length of the joint members 18 in the direction of extension thereof. End parts 60a of the respective partitions 60 on the side of the arrow X2 in the direction of extension thereof are formed in an arcuate shape. The end parts 60a of the partitions 60 are arranged on the downstream side of the other end parts 18b of the joint members 18 (on the upper side, the side of the arrow X2). The inclined sections 50 are integrally provided at the ends of the respective partitions 60 on the side of the arrow X1 in the direction of extension thereof.

The accommodation units 16 are provided respectively on both sides of the partitions 60 of the main body portion 58 along the direction (the direction of the arrows X1 and X2) in which the partitions 60 extend. In the embodiment shown in FIG. 8, the main body portion 58 is provided with two partitions 60 at an interval in the direction of the arrows Y1 and Y2. Therefore, the main body portion 58 includes three accommodation units 16 that lie adjacent to each other via the partitions 60. Each of the accommodation units 16 includes one guide unit 20, and two circulation units 22 disposed on both sides of the guide unit 20.

In other words, the main body portion 58 includes a total of three guide units 20 and six circulation units 22. As shown in FIG. 9, in the main body portion 58, when viewed in the vertical direction, the inner diameters of the guide units 20 are substantially the same, the inner diameters of the circulation units 22 are substantially the same, and the inner diameters of the guide units 20 are formed to be smaller than the inner diameters of the circulation units 22. However, the relationship between the size of the inner diameters of the guide units 20 and the size of the inner diameters of the circulation units 22 is not particularly limited.

Further, the number of the partitions 60 provided in the main body portion 58 is not limited to two. For example, the main body portion 58 may have two accommodation units 16 by providing only one partition 60, or may have four or more accommodation units 16 by providing three or more partitions 60. Further, in the case that the main body portion 58 includes a plurality of the accommodation units 16, instead of the direction (the vertical direction) in which the gas is supplied, a direction (the horizontal direction) perpendicular to the direction in which the gas is supplied may be set as the long-side direction of the main body portion 58.

The accommodation units 16 communicate with each other via upstream side communication ports 61a provided on the upstream side (the side of the arrow X1) and downstream side communication ports 61b provided on the downstream side (the side of the arrow X2) of the accommodation units 16. According to the present embodiment, as noted previously, the upstream side communication ports 61a are disposed between the inclined sections 50 provided at the ends of the partitions 60 on the side of the arrow X1, and the enclosure 34. Further, the downstream side communication ports 61b are provided between the end parts 60a of the partitions 60 on the side of the arrow X2, and the enclosure 34.

As noted previously, by the length of the partitions 60 in the direction of extension thereof being longer than the length of the joint members 18 in the direction of extension thereof, the other end parts 18b of the joint members 18 are arranged on the upstream side of the end parts 60a of the partitions 60 on the side of the arrow X2 (are arranged on the side of the arrow X1). In other words, the other end parts 18b of the joint members 18 are arranged on the upstream side of the downstream side communication ports 61b.

The guide unit 20, which extends in the long-side direction (the direction of the arrows X1 and X2), is provided substantially in the center of each of the accommodation units 16 in the short-side direction. The gas supply port 26 is provided below the guide unit 20 of each of the accommodation units 16. In the respective accommodation units 16, the facing portions 24 are provided so as to face toward the guide units 20 on the downstream side of the other end parts 18b of the joint members 18 and on the upstream side of the downstream side communication ports 61b.

Among the circulation units 22 shown in FIG. 8, in the circulation unit 22 (a circulation unit 22a) that is disposed on the end on the side of the arrow Y1 closest to the collection port 32, a triangular sealing member 52a is formed by the inclined section 50, the bottom side portion 54, and a portion of the enclosure 34 in the same manner as the circulation units 22 shown in FIG. 6.

Among the circulation units 22 shown in FIG. 8, in the circulation unit 22 (a circulation units 22b) that is disposed on the end on the side of the arrow Y2 farthest from the collection port 32, a quadrangular sealing member 52b is provided. The sealing member 52b is formed by the inclined section 50, an extending portion 62 that extends downward from the lower end part of the inclined section 50, and a corner portion of the enclosure 34. The extending portion 62 is formed by joining together the inner wall surfaces of the main body portion 58 by welding or the like.

Among the circulation units 22 shown in FIG. 8, in the circulation units 22 (circulation units 22c) that lie adjacent to each other via the partitions 60, the inclined sections 50 are provided which branch off from the partitions 60, and extend toward the side of the guide unit inlet ports 38 of the respective accommodation units 16. By integrally providing, between the lower ends of the inclined sections 50, bottom side portions 64 that extend along the short-side direction, triangular sealing members 52c are formed. The bottom side portions 64 are formed by joining together the inner wall surfaces of the main body portion 58 by welding or the like.

In the main body portion 58 as well, which is configured in the manner described above, by supplying the gas respectively via the gas supply ports 26, the gas can be made to flow through the guide units 20 in the direction (the vertical direction) in which the gas is supplied. When the gas flows through each of the guide units 20, the culture solution flow F2 is generated in the interior of each of the accommodation units 16.

The culture method, in which the culture device 10 equipped with the main body portion 58 shown in FIG. 8 and FIG. 9 is used, can be carried out in a similar manner to the culture method, in which the culture device 10 equipped with the main body portion 12 shown in FIG. 1 and FIG. 2 is used. Accordingly, in the culture device 10 equipped with the main body portion 58 shown in FIG. 8 and FIG. 9 and the culture method in which the culture device 10 is used as well, it is possible to satisfactorily culture the microalgae with a simple configuration while suppressing an increase in energy consumption.

In addition, in the culture device 10 equipped with the main body portion 58, by means of a simple configuration in which the partitions 60 are provided, a plurality of the accommodation units 16 can be disposed in the main body portion 58, and the microalgae can be satisfactorily circulated in the interior of each of these accommodation units 16. Therefore, the total amount of the microalgae that are capable of being satisfactorily cultured in the culture device 10 can be increased.

In the culture device 10 according to the above-described embodiment, the accommodation units 16 on both sides of the partitions 60 communicate with each other via the upstream side communication ports 61a provided on the upstream side, and the downstream side communication ports 61b provided on the downstream side in the direction in which the gas is supplied. Also in this case, it is preferable to suppress the movement of the microalgae between the plurality of accommodation units 16, for example, by setting the size and the arrangement of the upstream side communication ports 61a and the downstream side communication ports 61b. Consequently, it becomes possible to satisfactorily culture the microalgae inside each of the accommodation units 16 that are substantially independent of each other.

In the culture device 10 according to the above-described embodiment, the other end parts 18b (the downstream side end parts), which are the end parts of the joint members 18 on the downstream side in the direction of extension thereof, are arranged on the upstream side of the downstream side communication ports 61b. In addition, in the main body portion 58, on the downstream side of the other end parts 18b of the joint members 18 and on the upstream side of the downstream side communication ports 61b, the facing portions 24 that face toward the guide units 20 are formed by joining together the inner wall surfaces of the main body portion 58.

In this case, the culture solution (the contents M), which flows inside the guide units 20 from the side of the guide unit inlet ports 38 toward the side of the guide unit outlet ports 40, collides against the facing portions 24, whereby it becomes easier for the culture solution to move toward the circulation units 22, and the culture solution flow F2 can be generated even more satisfactorily. Similarly, concerning the facing portion 24 shown in FIG. 1, the culture solution that flows inside the guide unit 20 collides against the facing portion 24, whereby it becomes easier for the culture solution to move toward the circulation unit 22, and the culture solution flow F1 can be generated even more satisfactorily. Further, the culture solution (the contents M) that flows inside the guide units 20 collides against the facing portions 24, whereby the culture solution is prevented from flowing into the adjacent accommodation units 16, and movement of the microalgae between the plurality of accommodation units 16 is suppressed.

In the culture device 10 according to the above-described embodiment, the main body portion 58 is provided with one culture solution supply port 28 which is capable of supplying the culture solution to the accommodation units 16. Even if the plurality of accommodation units 16 are provided in the main body portion 58 in the manner described above, these accommodation units 16 are capable of communicating with each other via the upstream side communication ports 61a and the downstream side communication ports 61b. Therefore, it becomes possible to supply the culture solution and the microalgae to the plurality of accommodation units 16 from the one culture solution supply port 28. In accordance with this feature, it becomes possible to easily supply the culture solution and the microalgae to the accommodation units 16, and simplify the configuration of the culture device 10.

In the culture device 10 according to the above-described embodiment, the accommodation unit 16 is surrounded by the enclosure 34 which is formed by joining together the inner wall surfaces of the main body portion 58, the main body portion 58 is made from a material that transmits light, and the main body portion 58 is provided with one gas discharge port 30 that is capable of discharging the gas from the respective interiors of the accommodation units 16, and one collection port 32 that is capable of collecting the culture solution and the microalgae from the respective interiors of the accommodation units 16.

In this case, the so-called closed system culture device 10 can be obtained by means of a simple configuration in which the inner wall surfaces of the main body portion 58 are joined together to thereby form the enclosure 34. Even if the culture device 10 is formed as a closed system in this manner, since the plurality of accommodation unit 16 communicate with each other via the upstream side communication ports 61a and the downstream side communication ports 61b, the gas inside the accommodation units 16 can be discharged from one gas discharge port 30. Similarly, the culture solution and the microalgae in the accommodation units 16 can be collected from one collection port 32. Accordingly, it becomes possible to easily discharge the gas from the accommodation units 16 and collect the culture solution and the microalgae, and to simplify the configuration of the culture device 10.

Moreover, according to the above-described embodiment, although the culture device 10 is provided as a closed system by forming the accommodation units 16 which are surrounded by the enclosures 34 in the main body portions 12, 46, and 58, it is possible to make the culture device 10 in the form of an open system by providing openings on the upper part of the accommodation units 16 without forming the enclosures 34. In this case, it may be possible to discharge the gas and to collect the culture solution and the microalgae from the openings (not shown) of the accommodation units 16. More specifically, the gas discharge port 30 and the collection port 32 need not necessarily be provided in the main body portions 12, 46, and 58. Further, for example, in the case it is possible to irradiate the microalgae with a sufficient amount of light through the openings of the accommodation units 16, the main body portions 12, 46, and 58 may be formed from a material that does not possess a light transmitting property.

REFERENCE SIGNS LIST

10 . . . culture device
12, 46, 58 . . . main body portion
14 . . . water storage tank
16 . . . accommodation unit
18 . . . joint member
18c . . . inner side surface
18d . . . outer side surface
20 . . . guide unit
22 . . . circulation unit
24 . . . facing portion
26 . . . gas supply port
28 . . . culture solution supply port
30 . . . gas discharge port
32 . . . collection port
34 . . . enclosure
36 . . . water storage unit
38 . . . guide unit inlet port
40 . . . guide unit outlet port
50 . . . inclined section
52, 52a, 52b, 52c . . . sealing member
56 . . . position fixing hole
60 . . . partition
61a . . . upstream side communication port
61b . . . downstream side communication port
F1, F2 . . . culture solution flow
M . . . contents
W . . . stored water

What is claim is:

1. A culture device that cultures microalgae in a culture solution, the culture device comprising a main body portion that is flexible, the main body portion including:
an accommodation unit which is configured to accommodate the culture solution and the microalgae, and to which a gas is supplied;
a joint member that is formed by joining together inner wall surfaces of the accommodation unit and extends in a first direction in which the gas is supplied;
a guide unit and a circulation unit that are disposed in an interior of the accommodation unit, are adjacent to each other with the joint member being interposed therebetween in a second direction that is horizontal and perpendicular to the first direction, and lie respectively along the first direction in which the joint member extends; and
a gas supply port configured to enable the gas to be supplied to the guide unit,
wherein when the accommodation unit accommodating the culture solution and the microalgae is viewed from the first direction, the guide unit and the circulation unit are tubular and the main body portion is bound at the joint member in a third direction perpendicular to the first direction and the second direction,
the gas is supplied to the guide unit from a lower side to an upper side when the main body portion is installed at an installation location,
the guide unit and the circulation unit communicate with each other via a guide unit inlet port provided on an upstream side in the direction in which the gas is supplied, and a guide unit outlet port provided on a downstream side in the direction in which the gas is supplied, and
when the gas flows through the guide unit, a culture solution flow is generated in which the culture solution inside the circulation unit flows into the guide unit from the guide unit inlet port, and the culture solution inside the guide unit flows out from the guide unit outlet port into the circulation unit.

2. The culture device according to claim 1, wherein:
the guide unit is disposed between inner side surfaces of a pair of the joint members that face toward each other at an interval; and
the circulation unit is formed on a side of each of outer side surfaces of the pair of joint members.

3. The culture device according to claim 1, wherein end parts of the joint member in the direction in which the joint member extends have an arcuate shape.

4. The culture device according to claim 1, wherein an inclined section is formed in the circulation unit on a side of the guide unit inlet port by joining together inner wall surfaces of the main body portion, the inclined section being inclined in a direction away from the guide unit from the lower side toward the upper side when the main body portion is installed at the installation location.

5. The culture device according to claim 1, further comprising a water storage tank including a water storage unit in which stored water is stored, the main body portion being allowed to be installed in the water storage unit.

6. A culture device that cultures microalgae in a culture solution, the culture device comprising:

a main body portion including:

an accommodation unit which is configured to accommodate the culture solution and the microalgae, and to which a gas is supplied;

a joint member that is formed by joining together inner wall surfaces of the accommodation unit and extends in a direction in which the gas is supplied;

a guide unit and a circulation unit that are disposed in an interior of the accommodation unit, are adjacent to each other with the joint member being interposed therebetween, and lie respectively along a direction in which the joint member extends; and a gas supply port configured to enable the gas to be supplied to the guide unit, wherein the gas is supplied to the guide unit from a lower side to an upper side when the main body portion is installed at an installation location, the guide unit and the circulation unit communicate with each other via a guide unit inlet port provided on an upstream side in the direction in which the gas is supplied, and a guide unit outlet port provided on a downstream side in the direction in which the gas is supplied, and when the gas flows through the guide unit, a culture solution flow is generated in which the culture solution inside the circulation unit flows into the guide unit from the guide unit inlet port, and the culture solution inside the guide unit flows out from the guide unit outlet port into the circulation unit, wherein:

a sealing member that is isolated from the accommodation unit is formed in the main body portion by joining together inner wall surfaces of the main body portion; and a position fixing hole used when the main body portion is installed is provided on the sealing member.

7. A culture device that cultures microalgae in a culture solution, the culture device comprising:

a main body portion including:

an accommodation unit which is configured to accommodate the culture solution and the microalgae, and to which a gas is supplied;

a joint member that is formed by joining together inner wall surfaces of the accommodation unit and extends in a direction in which the gas is supplied;

a guide unit and a circulation unit that are disposed in an interior of the accommodation unit, are adjacent to each other with the joint member being interposed therebetween, and lie respectively along a direction in which the joint member extends; and a gas supply port configured to enable the gas to be supplied to the guide unit, wherein the gas is supplied to the guide unit from a lower side to an upper side when the main body portion is installed at an installation location, the guide unit and the circulation unit communicate with each other via a guide unit inlet port provided on an upstream side in the direction in which the gas is supplied, and a guide unit outlet port provided on a downstream side in the direction in which the gas is supplied, and when the gas flows through the guide unit, a culture solution flow is generated in which the culture solution inside the circulation unit flows into the guide unit from the guide unit inlet port, and the culture solution inside the guide unit flows out from the guide unit outlet port into the circulation unit, wherein:

a partition extending in the direction in which the gas is supplied is formed on the main body portion by joining together inner wall surfaces of the main body portion; and the accommodation unit is disposed on each of both sides of the partition along a direction in which the partition extends.

8. The culture device according to claim 7, wherein the accommodation units on the both sides of the partition communicate with each other via an upstream side communication port provided on the upstream side and a downstream side communication port provided on the downstream side.

9. The culture device according to claim 8, wherein:

a downstream side end part, which is an end part of the joint member on the downstream side in the direction in which the joint member extends, is arranged on the upstream side of the downstream side communication port; and a facing portion configured to face toward the guide unit is formed in the main body portion, on the downstream side of the downstream side end part and on the upstream side of the downstream side communication port, the facing portion being formed by joining together the inner wall surfaces of the main body portion.

10. The culture device according to claim 8, wherein one culture solution supply port configured to supply the culture solution to the accommodation units is provided in the main body portion.

11. The culture device according to claim 8, wherein:

the accommodation units are each surrounded by an enclosure formed by joining together the inner wall surfaces of the main body portion;

the main body portion is made from a material that transmits light; and the main body portion is provided with one gas discharge port configured to discharge the gas from respective interiors of the accommodation units, and one collection port configured to collect the culture solution and the microalgae from the respective interiors of the accommodation units.

* * * * *